United States Patent [19]

Barber

[11] 3,830,384

[45] Aug. 20, 1974

[54] LADING VEHICLE CARGO LIFT
[76] Inventor: John Chester Barber, 601 E. DeMar Blvd. Apt. 408, Pasadena, Calif. 91101
[22] Filed: Aug. 23, 1972
[21] Appl. No.: 283,169

[52] U.S. Cl. ............................................. 214/77 P
[51] Int. Cl. .............................................. B60p 1/44
[58] Field of Search .................................. 214/77 P

[56] References Cited
UNITED STATES PATENTS

| 2,779,488 | 1/1957 | Trotter et al. | 214/77 P |
| 2,843,277 | 7/1958 | Brannan | 214/77 P |
| 3,269,567 | 8/1966 | Lugash | 214/77 P |
| 3,517,838 | 6/1970 | Lugash | 214/77 P |
| 3,602,381 | 8/1971 | Size et al. | 214/77 P |
| 3,700,123 | 10/1972 | Corley, Jr. | 214/77 P |

FOREIGN PATENTS OR APPLICATIONS

| 614,629 | 6/1935 | Germany | 214/77 P |
| 640,885 | 8/1950 | Great Britain | 214/77 P |

*Primary Examiner*—Albert J. Makay
*Attorney, Agent, or Firm*—Wm. Jacquet Gribble

[57] ABSTRACT

A separate rear section of a truck or lading vehicle floor is supported by differently pivoted lift arm pairs actuated by a hydraulic cylinder such that the floor section may be selectively lowered from a position coplanar with the rest of the floor to a lower position in order to coincide with the varying elevations of loading docks, streets or other loading platforms. A hinged wheel ramp at the rear of the movable floor section acts as a partial tailgate when raised. Latch apparatus secures the moving floor section in its coplanar relationship to the lading vehicle floor for travel as a part of the loadbearing area.

5 Claims, 8 Drawing Figures

PATENTED AUG 20 1974 SHEET 1 OF 4 3,830,384

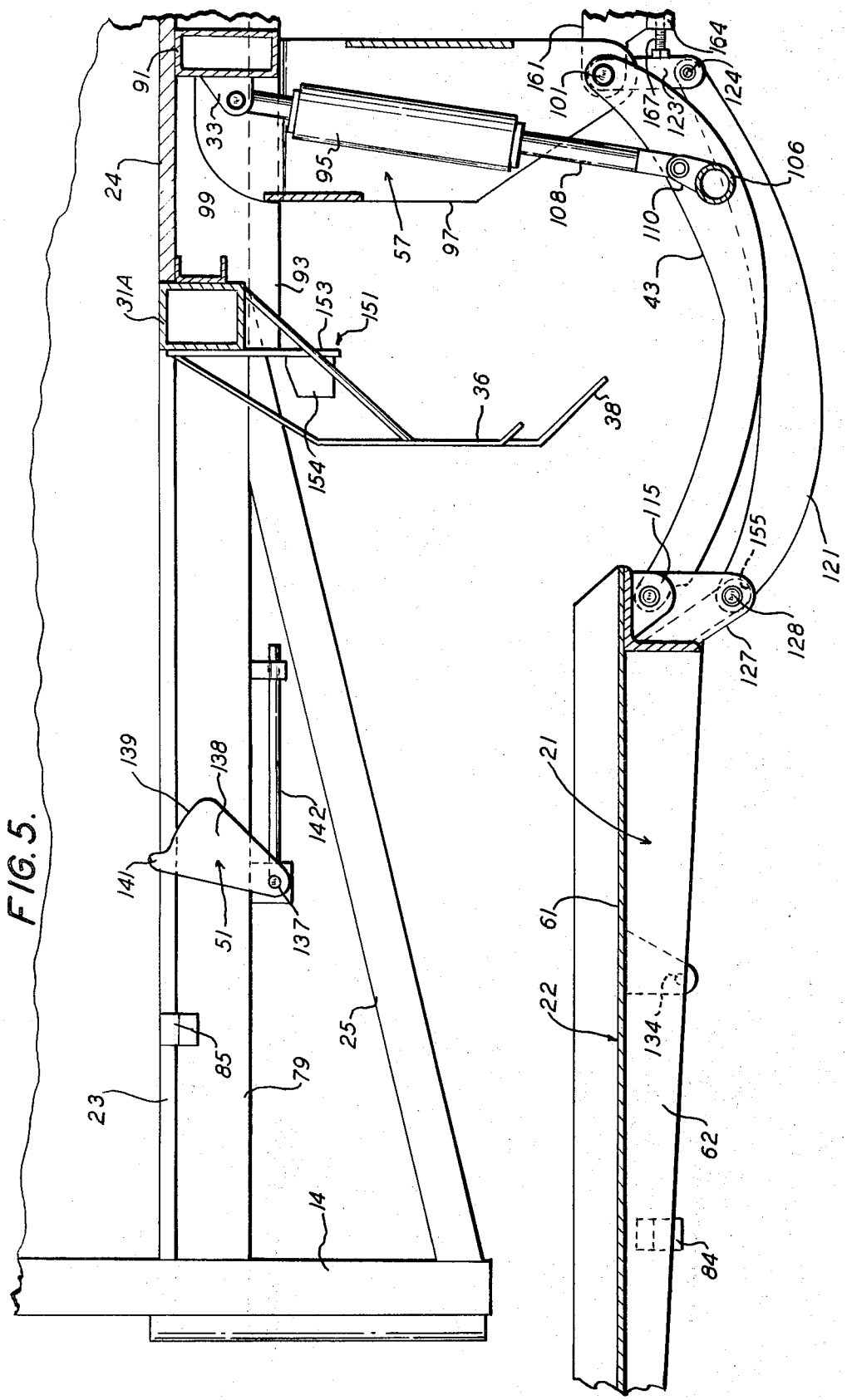

LADING VEHICLE CARGO LIFT

BACKGROUND OF THE INVENTION

Lading vehicles, such as trucks, are an important factor in moving materials from place to place, supplementing and, in some cases, displacing cargo movement by rail. Motor-driven trucks are particularly needed in moving cargo to and from points without rail connections. For instance, it is estimated that 5,500 cities within the state of California alone are farther than 10 miles from a railhead. Thus the importance of motor-driven trucks for short-haul use is evident.

One of the frequently encountered problems in loading and unloading lading vehicles is that the height of the surfaces to and from which the trucks must move cargo vary considerably. Another factor is the increasing use of load fraction "pods" into which cargo is placed in accordance with category or destination. The pods may be loaded into the lading vehicle in accordance with a definite pattern. For increasing mobility and lessening manpower needs many pods have rollers or wheels such that they themselves may become hand-powered vehicles. Thus any truck-loading device is preferably adapted to receive lesser wheeled vehicles, as well as materials moved on fork lifts and other cargo-moving devices, including pallet loads.

The lading vehicle of the invention solves the problems of varied height loading docks and various cargo containers by providing a moving floor section having an articulated wheel ramp attached thereto such that both ramp and floor section may be adjusted to the height of the loading dock and accommodate wheeled as well as palleted loads.

SUMMARY OF THE INVENTION

The invention contemplates, in a lading vehicle having a cargo floor, a cargo lift comprising an articulated vehicle floor section, a first pair of lift arms extending from pivots on the lading vehicle frame to the floor section and a second pair of arms pivoted from differently located fixed points on the vehicle frame and joined to the articulated floor section. One or more hydraulic cylinders mounted to the vehicle frame displace a bearing bar secured to one pair of pivot arms to move the pairs of pivot arms about their respective pivot pins such that the articulated floor section moves from an elevated position coplanar with the floor to a selected lowered position parallel to the floor. Preferably the apparatus of the invention also includes locking means securing the articulated floor section in elevated position coplanar with the lading vehicle cargo floor and a hinged loading ramp at the rear of the floor section which also acts as a tailgate when in raised position perpendicular to the articulated floor section.

The described inventive apparatus fulfills the objective of providing a lading vehicle with an articulated floor section cargo lift capable of assuming various loading elevations. Another fulfilled objective is the provision of a lading vehicle with a cargo lift capable of raising, lowering and transporting cargo. A further object of the invention is to provide a cargo lift having an articulated wheel ramp which serves both as a loading ramp and as a tailgate.

These and other advantages of the invention are apparent from the following detailed description and drawing.

BRIEF DESCRIPTION OF THE DRAWING

FIG. 5 is a longitudinal sectional elevation similar to FIG. 4 showing the cargo lift in partial lowered position;

GENERAL ORGANIZATION

Figure 1:
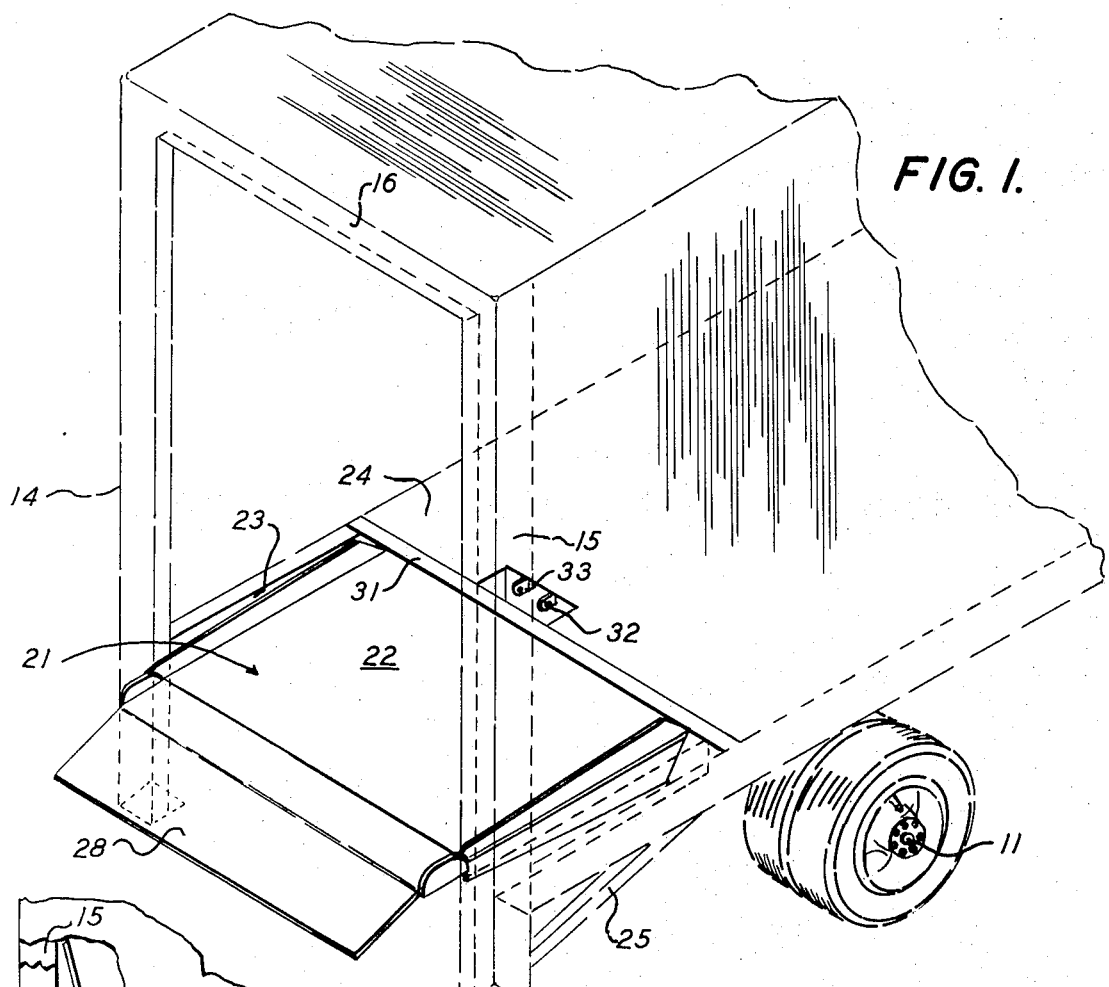
FIG. 1 is a fragmentary rear perspective view, partially broken away, of a lading vehicle in accordance with the invention.
Figure 3:
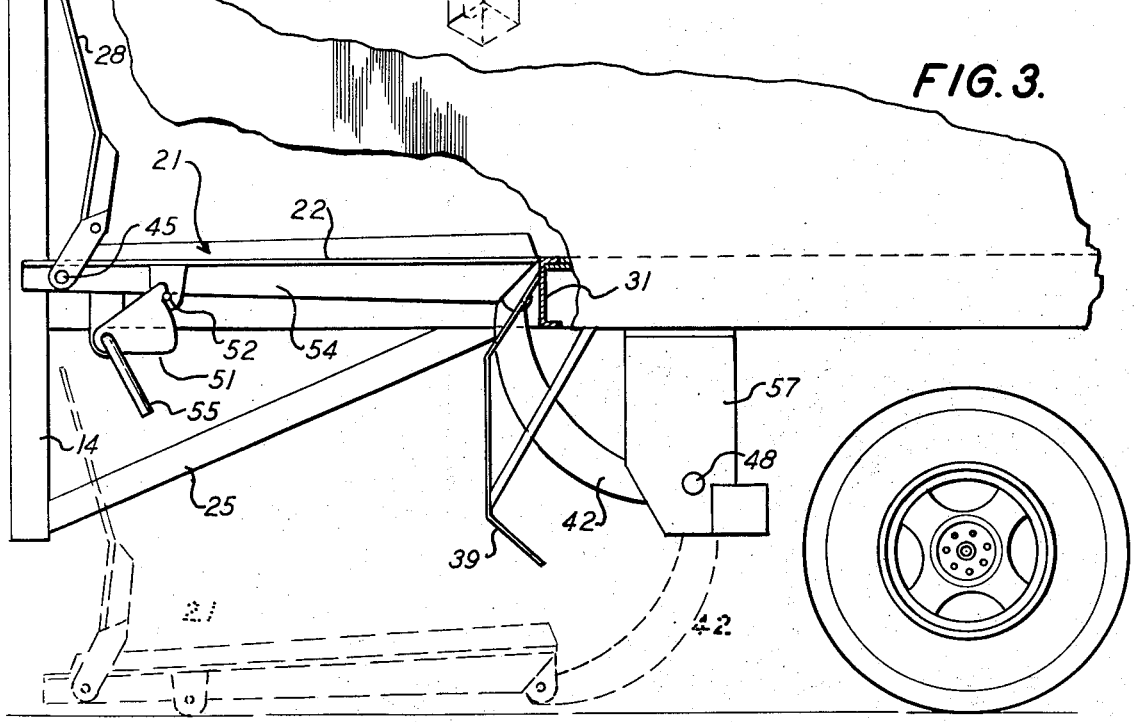
FIG. 3 is a fragmentary schematic side elevation, partly broken away, of the embodiment of FIG. 1.
Figure 2:
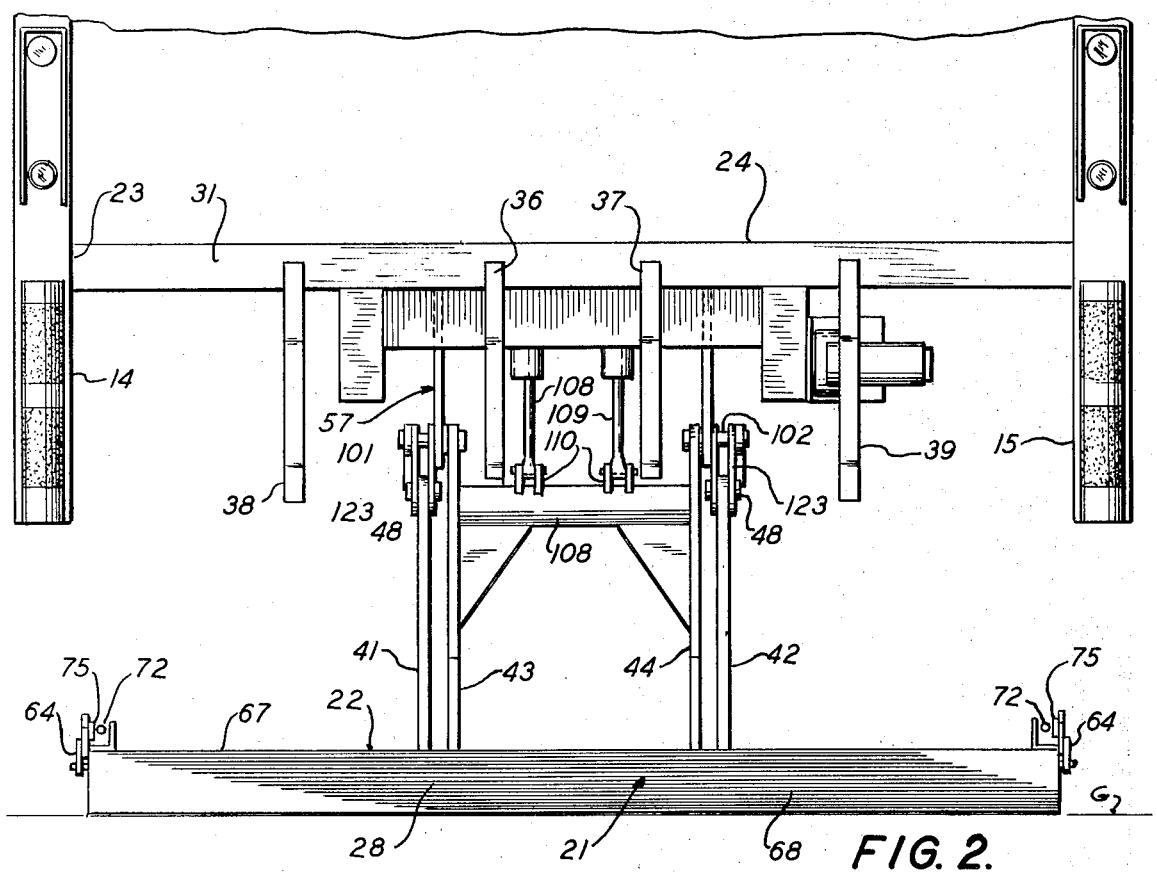
FIG. 2 is a fragmentary rear elevation of the embodiment of FIG. 1.

FIGS. 1, 2 and 3 show the general organization of the cargo lift section of the vehicle of the invention. Since the invention is adapted to cargo vehicles of many types, only that portion of the vehicle, the rear van section, is shown. The power requirements, of course, will vary with the particular service in which the vehicle is to perform. Vehicles in accordance with the invention have performed admirably in cooperation with the Postal Service in vehicles rated at six and a half tons pay load and with a 16-foot or better van wherein the cargo lift of the invention has proved adaptable to expeditious handling of roll-on and roll-off carts or pods.

In FIG. 1, the van box is shown in phantom lines above rear dual wheels on a rear axle 11. The cargo lift apparatus is normally to the rear of the rear axle. Vertical posts 14 and 15, together with a roof girder 16, define a doorway at the rear of the van. In FIG. 1 a cargo lift 21 with a deck 22 is in its raised position, preferably 48 inches from the ground upon which the wheels sit. The cargo lift raises and lowers within a floor opening 23 and in the raised position is coplanar with a floor 24 of the van.

Also shown in FIG. 1 are braces, like brace 25, necessary to give the vertical posts 14 and 15 rigidity due to the lack of any transverse structure at the bottom of the doorway.

The cargo lift deck 22 does not itself extend beyond the doorway, but, as shown in FIG. 1, a hinged ramp 28 does so extend. The box girder 31 of FIG. 1 is shown with mounting ears 32, 33 for the preferred two hydraulic cylinders which actuate the pairs of pivot arms (not shown) which cause articulation of the cargo lift deck from the raised position of FIG. 1 to the lowered position in accordance with the height of the dock to which the vehicle is addressed.

A schematic rear view in FIG. 2 shows the doorway framed by the uprights 14 and 15 and a transverse beam 31 at the juncture of the vehicle floor 24 and the cargo lift deck. The beam 24 extends over the normal longitudinal stringers which form the frame of the vehicle chassis to the longitudinal girders of the van frame.

Cargo guards 36, 37, 38, 39 are fixed at their tops to the transverse beam and depend forward of the rear axle. The inner guard strips 37, 36 are spaced from the longitudinal center line of the vehicle to provide for operating space for spaced pairs of articulating arms 41, 42 and 43, 44, the latter pair being the inner pair of coupled spaced arms.

Turning now to schematic FIG. 3, which is a fragmentary side view, the cargo lift deck is shown in its raised position coplanar with the van floor and the ramp is illustrated in a raised position being responsive to an over-center spring arrangement to be described later. The ramp is pivoted at 45 on either side of the frame to move between the positions of FIG. 1 and FIG. 3. The brace 25 is shown in FIG. 3 extending from the van lower frame to the uprights to secure them rigidly.

A locking mechanism 51 is shown engaged with a pin 52 on the side channel 54 of the cargo lift. The latch is manipulated by a handle 55 and a like latch mechanism is operable at the opposite side of the vehicle, such that both sides of the cargo lift may be locked in position for travel with the cargo lift deck forming a part of the floor and bearing its share of the load.

Also visible in FIGS. 1 and 3 are the cargo guards 36–39, the hydraulic cylinder frame 57 and the outer pair of lift arms shown extending from their pivot 48 to the underside of the cargo lift deck.

The dotted position of the cargo lift and ramp shown in FIG. 3 represents the lower position of the cargo lift when it is seated on the ground with the ramp in its lowered position such that wheeled cargo pods or carts may be rolled onto the cargo lift deck for raising to the level of the van floor. The capacity of the cargo lift is approximately 5,000 pounds and such lift capacity may be achieved with either one or two hydraulic cylinders powered in the usual manner from hydraulic pumps operating from engine auxiliary equipment or from special electric pumps worked from the vehicle generator battery assembly. Due to the multiplication factor of the lift arms, the piston travel of the hydraulic cylinder need not be great and the consequent weight of the hydraulic cylinders may be reduced.

While the cargo lift deck may be of a special design, it has been found that a gate lift, such as the Waltco lift 1093, is suitable in terms of dimensions and strength for the installation in the vehicle described.

Figure 4:
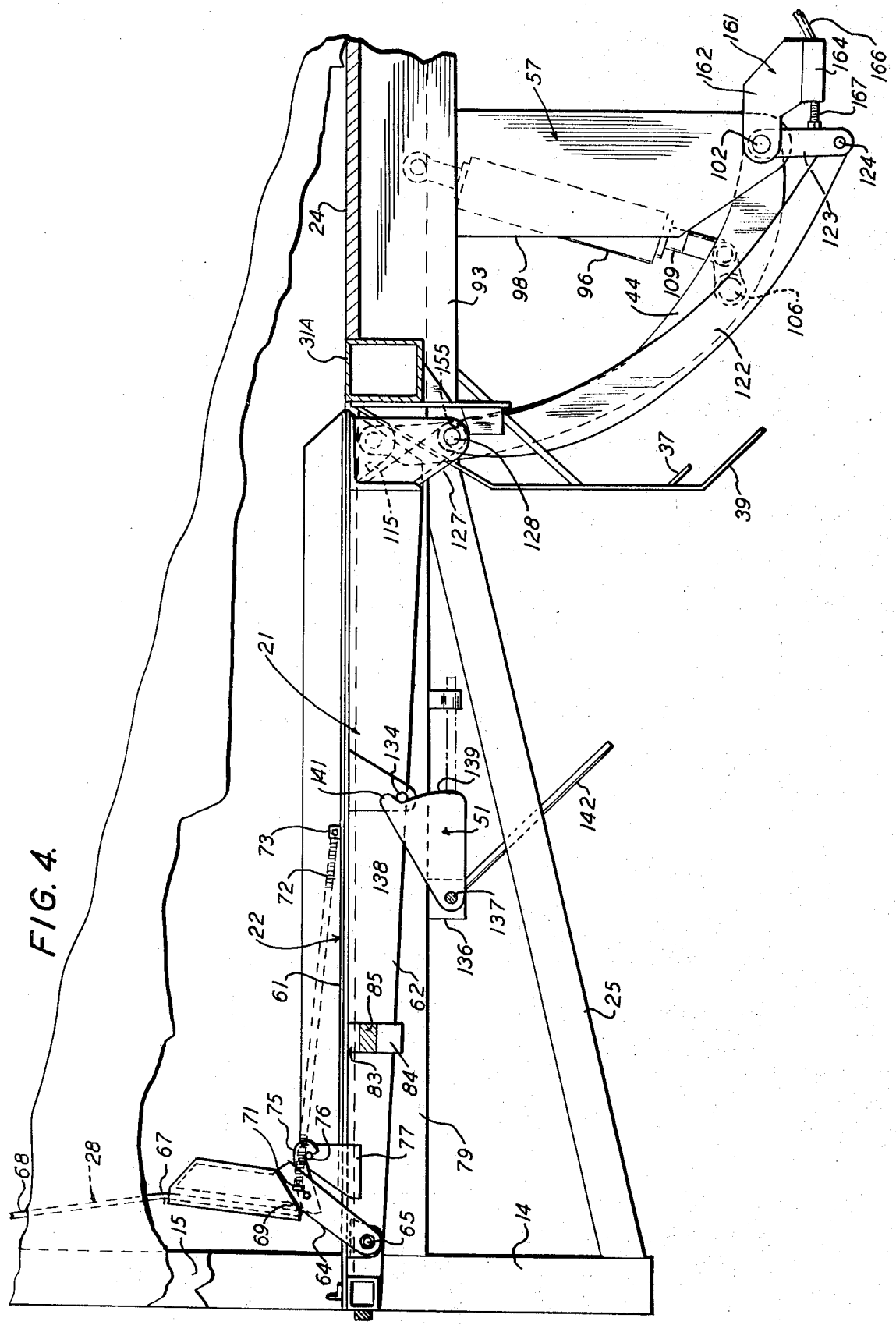
FIG. 4 is a fragmentary longitudinal sectional elevation of the cargo lift of the invention in raised position.

Turning now to FIGS. 4 and 5, the longitudinal section of FIG. 4 shows in enlarged detail the ramp mounting and the lift arm arrangement for the cargo lift. In FIG. 4 the van frame members 14 and 15 are shown fragmentarily and the cargo lift deck 22 is shown extending to the rear of the van. The cargo lift comprises a steel decking 61 which is fixed to a plurality of tapered beams 62 that may be either metal channel or box girders. At each side of the deck 22 a hinge arm 64 extends at an upward angle forwardly from a hinge pin 65 secured to the cargo lift beam, as shown in detail section in FIG. 7.

The hinges support ramp 28, which has a secondary ramp portion 67 with a sloping portion 68. The secondary portion is fixed to a hinge at each side. The sloping extension of the ramp may extend 28 inches beyond the 10 inch extension of the ramp hinge from the hinge pin 65.

At the bend point 69 of each hinge member is a spring mount 71 for an extension spring 72 that has its other end fastened to a lug 73 toward the forward portion of the cargo lift deck. The springs therefore load the ramp into the raised vertical position of FIG. 4, enabling latches 75 on each side of the ramp to engage a lock pin 76 supported above the cargo lift deck by a side plate 77, as seen in FIG. 4.

The ramp hinge pin 65 and the latch 75 are immediately adjacent the longitudinal frame girder 79 of the van body, which terminates on either side of the van at the vertical frame members 14, 15. Sufficient clearance is provided between the girder and the ramp hinge mechanism such that the lift and the ramp clear the girders when the cargo lift is lowered.

Figures 6, 7, 8:
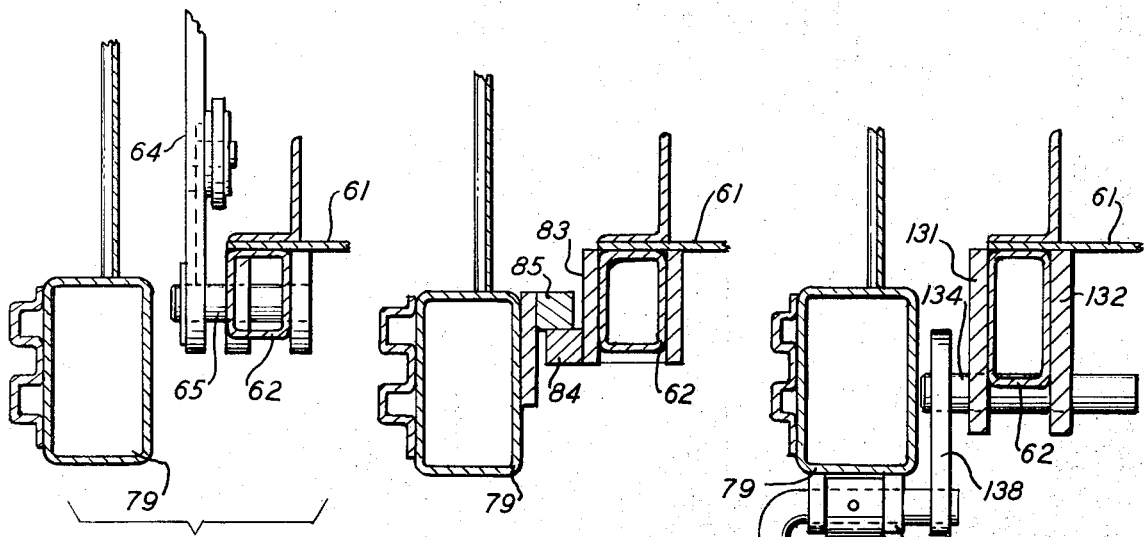
FIG. 6 is a detailed fragmentary side elevation of the latch mechanism for the cargo lift.
FIG. 7 is a fragmentary transverse section taken along line 6—6 of FIG. 3.
FIG. 8 is a fragmentary sectional detail of the wheel ramp hinge.

In FIG. 8 a fragmentary sectional view shows the stop that limits upward travel of the cargo lift. The longitudinal girders 79 afford support for a plate 81 and a stop bar 82 located forward of the ramp hinge latch 75 on each side of the vehicle. As can be seen from FIG. 8, each tapered beam 62 of the cargo lift also has a plate 83 and a bar 84 which may also be of welded construction. The bars of the longitudinal girder and the beam 62 are located such that the upper surface of the cargo lift beam stop bar impinges upon the lower surface of the girder stop bar on each side of the vehicle when the cargo lift deck coincides with the floor 24 of the van.

By locating the ramp hinge latch 75 near the rear entry of the vehicle the latch is easily accessible whether the cargo lift is in its raised or lowered position. The ramp can thus be unlatched and moved downwardly and outwardly against the springs 72 to contact the loading dock surface regardless of dock elevation with respect to the ground upon which the vehicle rests. Depending upon the area of the cargo lift deck occupied by the load, the ramp may be raised during the elevation of the cargo lift to preclude outward movement of a load on the deck.

Referring now to FIGS. 4 and 5 with regard to the lift mechanism for the cargo lift, a box beam 91 extends between the spaced longitudinal chassis frame members 93 adjacent the rear hangers 94 of the rear axle. The tops of a pair of hydraulic cylinders 95, 96 are mounted to the rearward face of the beam such that the cylinders depend downwardly. Transversely spaced mounting plates 97, 98 are fixed at their upper portions to a carriage 99, which is swing-mounted with respect to the chassis frame members 93 for precise longitudinal adjustment of the pivots 101, 102 upon which an inner pair of lift arms 104, 105 for the cargo lift is fastened. Slightly to the rear of the pivot points a bearing bar 106 is fixed between the inner lift arms and the piston rods 108, 109 of the hydraulic cylinders are secured thereto by pins in pairs of spaced pivot plates 110. The bearing bar is displaced from the lift arm pivots longitudinally of the vehicle such that substantially vertical motion of the hydraulic pistons displaces the lift arms in arcuate fashion about the pivots 101, 102. Pivot pins in depending cargo lift support ears 115 secure the outboard ends of the inner lift arms directly below the lift deck.

When the bearing bar is depressed by action of the cylinders the outboard ends of the lift arms descend, carrying the cargo lift downwardly away from coplanar relationship to the rest of the van floor. Since the cargo lift would otherwise be free to pivot at ears 115 with respect to the outboard ends of the inner lift arms, and swing under the cargo load to an angle to the horizontal, an outer pair of spaced leveler arms 121, 122 is arranged to secure the cargo lift in horizontal relationship throughout the travel arc of the inner lift arms. This parallel condition of the cargo lift is preferably achieved by securing the forward ends of the outer leveler arms between spaced pairs of swing straps 123 by pins 124, spacing the pivot pins 124 like distances below the pivot points of the rearward ends of the lift arms. In similar fashion, support ears 127 on the cargo deck depend to hold pivot pins 128 that secure the outboard ends of the leveler arms equal distances below the pivot points of the inner lift arms. The vertical intervals between inboard and outboard pivot points of the inner and outer arms are substantially the same, such that the slight longitudinal displacement of the inboard leveler arm pivot afforded by the swing strap pin mounting maintains the cargo lift deck in horizontal position during ascents and descents, cantilevered from the top pairs of support arms.

In order to achieve clearances for movement and to reduce weight, each of the pairs of support arms is configured curvilinearly, as seen in FIG. 4 and FIG. 5. The amount of curvature and the distances between pivot points for the arms varies with the desired lift span. The illustrated embodiment has an effective lift span of from 0 to 48 inches above the ground upon which the vehicle rests. Vertical displacement between pivot pin pairs is about 5½ to 7 inches and about 21 inches separates the ends of a support arm longitudinally when the cargo lift is up.

While a pair of hydraulic cylinders is shown, embodiments using a single cylinder have been employed successfully. Because of the relatively limited space for mounting, a pair of cylinders with a power sum equal to a desired single cylinder has been found to be more easily mounted. In the embodiment illustrated two 4½ inch diameter cylinders with 10 inch stroke thrust against a 4½ inch diameter bearing bar. The pivot plates on the bearing bar have pivot points displaced about 3 to 4 inches from the center line of the bar.

Many of the rather rigid road safety requirements for vehicles of the capacity and size contemplated by the invention have been incorporated in the illustrative inventive apparatus. For instance, in FIGS. 4 and 6 the latch mechanism for securing the cargo lift in travel position is shown. In FIG. 6 one cargo lift side beam 62 is shown with a pair of spaced plates 131, 132 fixed thereto through which a transverse lock pin 134 extends. As previously described, the clearance between the cargo lift and the longitudinal van frame girder 79 is minimal. It is therefore possible to mount a pivot bracket 136 to the bottom portion of the van girder to receive a crank 137 to which a latch flange 138 is affixed. The forward face 139 of the latch flange is a cam surface which bears against lock pin 134 and the cam surface terminates in a tang 141 which securely engages the lock pin. The latch flange is moved into position by a cam lock handle 142 which is also shown in FIG. 3. The cam lock assembly is of course duplicated on the opposite side of the vehicle.

In addition to the swing carriage for adjustment of the cargo lift attitude, the invention comprises cam means for guiding and locating the cargo lift in final raised position. In FIG. 5 cam assembly 151, which is duplicated on the other side of the vehicle, has a transverse plate 153 holding a sloping cam 154 that contacts a round 155 fixed to the lift deck when the lift is raised.

An added adjustment is afforded by a pivot carrier assembly 161 shown in FIG. 5 that has a plate 162 through which the pivot 101 of the one inner lift arm extends to the mounting plate 97. A threaded housing 164 is fixed to the bottom of plate 162 and holds an adjustment screw therein. A brace 166, secured in convenient fashion to the truck frame, fixes the position of the carrier assembly. Screw 167 stops swing strap 123, limiting the position of leveler arm 121 at the end of the return to raised position of the cargo lift such that the deck thereof is level and coplanar with the van floor.

The structural details of the cargo lift in terms of stringers and plate sizes have not been given because of the great variation in cargo demands possible. Other details, such as weather stripping and power sources for the hydraulic cylinders, are achievable conventionally and form no part of the invention. Fluid pumps for the cylinders can be electrically or power shaft motivated, and controlled conventionally by valving well known in the art.

Other variations inside the parameters of the invention will occur to those skilled in the art. It is therefore desired that the invention be measured by the appended claims rather than by the illustrative embodiment disclosed herein.

I claim:

1. In a lading vehicle having longitudinally extending support means and a cargo floor supported by said longitudinally extending support means, a cargo lift comprising an articulated segment of the cargo floor, a first pair of pivots, first means connected to and extending downwardly from said longitudinally extending support means for supporting the pivots with respect to the vehicle, a first pair of lift arms extending from the first pivots to the articulated segment of the cargo floor, first pivot means securing the lift arms to said articulated segment of the cargo floor, a second pair of pivots, second means connected to said first means for securing the second pair of pivots for swinging displacement with respect to the first pair of pivots, a second pair of lift arms secured to the second pair of pivots, second pivot means joining the lift arms to the articulated segment of the cargo floor at points vertically displaced from the first pivot means securing the lift arms to said cargo floor, said first and second pivot means being secured beneath the articulated segment of the cargo floor; motive means mounted to the vehicle and adapted to move the pairs of pivot arms about the pivots such that the articulated segment of the cargo floor moves between an elevated position coplanar with the vehicle cargo floor and a lowered position parallel to said floor; locking means mounted partly on said longitudinally extending support means and partly on said articulated segment of the cargo floor and located rearwardly of said first and second pivot means for joining and locking said articulated segment of the cargo floor to said longitudinally extending support means when in said elevated position for transferring a portion of the cargo load on said articulated segment of the cargo floor to said longitudinally extending support means; a loading ramp; and hinges affixing the loading ramp to the rear edge of said articulated segment of the cargo floor, said loading ramp having two sections defining a dihedral angle, and means securing selectively the loading ramp in alternative loading and cargo-securing positions.

2. Apparatus in accordance with claim 1 wherein the pair of pivots are displaced one pair with respect to the other vertically of the vehicle.

3. Apparatus in accordance with claim 1 further comprising cargo guards spared transversely of the vehicle depending from the vehicle frame adjacent the juncture of the floor section and the fixed cargo floor of the lading vehicle.

4. Apparatus in accordance with claim 1, wherein said locking means includes a locking pin, means mounting said locking pin to the articulated segment of the cargo floor, a plate defining a locking pin engaging cam surface, means mounting said plate to the longitudinally extending support means, and actuating means for selectively engaging the cam surface and said locking pin in order to effect the load transfer.

5. Apparatus in accordance with claim 1, further comprising cam means and means mounting said cam means to the cargo floor, said cam means serving to guide and locate the articulated segment of the cargo floor relative to the remainder of the cargo floor during movement of the articulated segment into its elevated position.

* * * * *